(12) United States Patent
Thompson (10) Patent No.: US 10,569,698 B2
(45) Date of Patent: Feb. 25, 2020

(54) CYCLING GARMENT WITH TURN INDICATING SYSTEM

(71) Applicant: FORD GLOBAL TECHNOLOGIES, LLC, Dearborn, MI (US)

(72) Inventor: Thomas Robert George Thompson, Brentwood Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 15/956,260

(22) Filed: Apr. 18, 2018

(65) Prior Publication Data

US 2018/0304800 A1    Oct. 25, 2018

(30) Foreign Application Priority Data

Apr. 19, 2017 (GB) .................................. 1706163.1

(51) Int. Cl.
*B60Q 1/26* (2006.01)
*B60Q 1/36* (2006.01)
(Continued)

(52) U.S. Cl.
CPC .......... *B60Q 1/2673* (2013.01); *A41D 1/002* (2013.01); *A41D 13/01* (2013.01); *A41D 27/205* (2013.01);
(Continued)

(58) Field of Classification Search
CPC ...... B60Q 1/2673; B60Q 1/36; A41D 27/205; A41D 1/002; A41D 13/01;
(Continued)

(56) References Cited

U.S. PATENT DOCUMENTS 4,403,211 A * 9/1983 Shibata .................... B62J 6/003
340/476
6,558,016 B1   5/2003 Restauro
(Continued)

FOREIGN PATENT DOCUMENTS

CN    104138077 A    11/2014
CN    104305579 A    1/2015
(Continued)

OTHER PUBLICATIONS

Joe Lindsey, "This Cycling Jacket Offers Turn-by-Turn Directions," Bicycling: Bikes & Gear Training News, Hearst Communications, Inc., Sep. 25, 2015, 7 pages.
(Continued)

*Primary Examiner* — Ryan W Sherwin
(74) *Attorney, Agent, or Firm* — Frank A. MacKenzie; Brooks Kushman P.C.

(57) ABSTRACT

A garment for cycling, having indicating lights associated with sleeves of the garment; first and second accelerometers provided on respective sleeves; and a controller configured to receive data from the accelerometers and determine from the date whether a wearer of the garment has raised an arm to indicate a maneuver. The controller is further configured to illuminate the appropriate indicating light depending on which arm has been raised, and to compare the data from the first and second accelerometers to filter out movements common to both the first and second accelerometers and determine when the sleeves are being moved independently of one another in a manner to indicate a turn.

19 Claims, 5 Drawing Sheets

(51) Int. Cl.
  *G08B 5/00* (2006.01)
  *A41D 13/01* (2006.01)
  *G08B 25/01* (2006.01)
  *A41D 27/20* (2006.01)
  *A41D 1/00* (2018.01)
  *B62J 6/00* (2020.01)

(52) U.S. Cl.
  CPC .............. *B60Q 1/36* (2013.01); *G08B 5/004* (2013.01); *G08B 25/016* (2013.01); *A41D 2600/102* (2013.01); *A41D 2600/104* (2013.01); *B62J 6/005* (2013.01)

(58) Field of Classification Search
  CPC ........ A41D 2600/104; A41D 2600/102; G08B 25/016; G08B 5/004; B62J 6/005
  See application file for complete search history.

(56) References Cited

U.S. PATENT DOCUMENTS

| | | |
|---|---|---|
| 9,096,174 B1 | 8/2015 | Banks |
| 2002/0044052 A1 | 4/2002 | Stewart |
| 2002/0145864 A1 | 10/2002 | Spearing |
| 2003/0213045 A1 | 11/2003 | Fuentes |
| 2004/0156215 A1 | 8/2004 | Wooldridge |
| 2004/0177428 A1 | 9/2004 | Maese |
| 2004/0184262 A1 | 9/2004 | De Silva |
| 2006/0291192 A1 | 12/2006 | Hill |
| 2007/0063831 A1 | 3/2007 | Barry et al. |
| 2008/0089056 A1 | 4/2008 | Grosjean |
| 2009/0134992 A1 | 5/2009 | Pacheco et al. |
| 2009/0144887 A1 | 6/2009 | Orandi |
| 2010/0251453 A1* | 10/2010 | Chen .................. B60Q 1/2673 2/69 |
| 2010/0253501 A1 | 10/2010 | Gibson |
| 2014/0254143 A1 | 9/2014 | Wansor |
| 2015/0016095 A1 | 1/2015 | Kretzu |
| 2015/0106996 A1* | 4/2015 | Lau .................... B60Q 1/2673 2/160 |
| 2015/0176825 A1 | 6/2015 | Bernstein |
| 2016/0073706 A1 | 3/2016 | Hartnett et al. |
| 2016/0123572 A1 | 5/2016 | Mohadjeri |
| 2016/0144775 A1 | 5/2016 | Ejiawoko |
| 2016/0185280 A1* | 6/2016 | Coles .................. B60Q 1/2676 340/432 |
| 2017/0181255 A1 | 6/2017 | Jeremy et al. |

FOREIGN PATENT DOCUMENTS

| | | | |
|---|---|---|---|
| CN | 104886796 A | 9/2015 | |
| CN | 105595482 A | 5/2016 | |
| DE | 202006019330 U1 | 4/2008 | |
| DE | 102015001144 A1 * | 8/2016 | .............. B62J 6/005 |
| DE | 102015001144 A1 | 8/2016 | |
| EP | 0985354 A1 | 3/2000 | |
| ES | 2396285 R1 | 5/2013 | |
| FR | 2529296 A1 | 12/1983 | |
| GB | 2331801 A | 6/1999 | |
| GB | 2411226 A | 8/2005 | |
| GB | 2440552 A | 2/2008 | |
| GB | 2521652 A | 7/2015 | |
| GB | 2533460 A | 6/2016 | |
| GR | 20120100140 A | 10/2013 | |
| JP | H02265101 A | 10/1990 | |
| WO | 2005034663 A1 | 4/2005 | |

OTHER PUBLICATIONS

Dan Graziano, et. al., "Wearable tech at CES 2016 was all about one thing: fitness," CNet, CBS Interactive Inc., Jan. 10, 2016, 5 pages.

Les Shu, "LEDs in Lumenus apparel aren't just flashy, they could help save lives," Digital Trends, Designtechnica Corporation, Oct. 29, 2018, 11 pages.

Joe Lindsey, "Lumenus Founder Jeremy Wall Is the Steve Jobs of the Outdoor Industry: The 23-year-old inventor on upgradable smart jackets, Zero UI, and why the Apple Watch isn't the future of wearables," Outside, Mariah Media Network LLC, Nov. 23, 2015, 6 pages.

Erika Owen, "This Light-Up Jacket Will Change Everything for Vacationing Cyclists," Travel + Leisure, Meredith Corporation Travel & Leisure Group, Nov. 6, 2015, 3 pages.

Romain Dillet, "With Lumenus smart cycling apparel, you can leave your boring cycling jacket at home," TechCrunch, Oath Tech Network, May 9, 2016.

GB Search report for GB 1706163.1 dated Jul. 19, 2017, 7 pages.

* cited by examiner

CYCLING GARMENT WITH TURN INDICATING SYSTEM

CROSS-REFERENCE TO RELATED APPLICATIONS

This application claims foreign priority benefits under 35 U.S.C. § 119(a)-(d) to Application GB 1706163.1 filed Apr. 19, 2017, which is hereby incorporated by reference in its entirety.

TECHNICAL FIELD

This disclosure relates generally to a garment and indicating system and method and particularly, although not exclusively, relates to a garment, such as a cycling garment, with accelerometers to determine when a wearer has moved their arm to indicate a maneuver.

BACKGROUND

Jackets with integral lights have previously been proposed to increase the visibility of the wearer, e.g. when cycling. Similar jackets can be also be worn when riding a motorbike, scooter, horse etc. It is desirable to also indicate an intended maneuver of the wearer so that other people can respond accordingly. Cyclists tend to indicate their intention to turn by raising the appropriate arm. However, such an indication is not always clearly visible, e.g. in low light conditions.

SUMMARY

According to an aspect of the present disclosure, there is provided a garment, e.g. jacket, for cycling, the garment comprising:

at least one first indicating light associated with a first sleeve of the garment;

at least one second indicating light associated with a second sleeve of the garment;

a first accelerometer provided on the first sleeve of the garment;

a second accelerometer provided on the second sleeve of the garment; and a controller configured to receive data from the first and second accelerometers and determine whether a wearer of the garment has moved, e.g. raised, an arm to indicate a maneuver, the controller being further configured to illuminate the appropriate first or second indicating light depending on which arm has been moved, wherein the controller is configured to compare the data from one of the first and second accelerometers with data from the other of the first and second accelerometers to filter out movements common to the accelerometers and determine when one of the first and second sleeves is being moved independently of the other of the first and second sleeves, and wherein the controller is configured to determine when the first and second accelerometers are moving (as defined by displacement, velocity and/or acceleration) in opposite directions along a vertical and/or longitudinal axis with approximately equal magnitude, and thereby determine that one of the first and second sleeves is not being moved independently of the other of the first and second sleeves. In the present context, "approximately equal magnitude" may be defined as being within a predefined range or tolerance of being equal in magnitude.

For example, when leaning into a corner one sleeve may move downwards while the other moves upwards and when turning a handlebar one sleeve may move forward while the other moves rearward.

The controller may offset a baseline signal from the first and second accelerometers, e.g. due to the overall motion of the wearer, to determine when an arm is being moved to indicate a maneuver. In this way, the overall motion may be effectively cancelled out so that movement of the arm independent of the rest of the wearer may be determined.

The first and second accelerometers may be three-axis accelerometers, e.g. providing acceleration in three orthogonal axes. The acceleration data may be provided to the controller. The controller may integrate the accelerations to deduce velocities and/or displacements. Alternatively, the integration may be carried out by the accelerometers and the velocity and/or displacement data may be sent to the controller. Either way the controller may compare one or more of acceleration, velocity and displacement in one or more axes to determine whether the wearer of the garment has raised a particular arm.

The first and second accelerometers may be provided at a wrist end of the first and second sleeves respectively. The controller may be calibrated to account for the default position of the wearer's wrists. For example, in the case of the garment being used for cycling, the controller may determine in which orientation the wrists are relative to a handlebar of a bicycle. Based on the calibration the controller may transform the movement data from the accelerometers, which may be in a frame of reference relative to the accelerometer, into data in a frame of reference relative to the wearer (or bicycle).

The calibration may be achieved in an initial period of cycling where lateral oscillation and a forward acceleration may assist the controller in determining the orientation of each accelerometer's frame of reference (relative to that of the wearer or bicycle). The calibration may be adjusted during a journey, e.g. to account for the wearer changing default wrist/grip position. For example, the controller may determine when movement data has transformed into a different frame of reference, e.g. by detecting a sudden change in the movement data received and detecting that similar movement data exists in a different frame of reference. The calibration may be adjusted to be relative to said different frame of reference.

Additionally or alternatively, the first and second accelerometers may be provided at a position on the respective sleeve away from the wrists, e.g. in the region of an elbow or upper arm, where the orientation of the arm depends less on the riding position.

The controller may continue to track movement of the first and second accelerometers and may switch off the indicator light when it is determined that the arm is no longer raised.

The controller may be configured to determine when one of the first and second accelerometers is moving relative to the other of the first and second accelerometers beyond a threshold amount in a predetermined direction. The controller may thus determine that the one of the first and second sleeves is being moved independently of the other of the first and second sleeves.

The controller may be configured to determine when the first and second accelerometers are moving in substantially the same direction (e.g. in/along a vertical, lateral, and/or longitudinal axis) with approximately equal magnitude of displacement, velocity and/or acceleration. The controller may thus determine that one of the first and second sleeves is not being moved independently of the other of the first and second sleeves. For example, when moving forward or going over a bump, both accelerometers may move in substantially the same direction and with approximately equal magnitude of displacement, velocity and/or acceleration. In the present context, "substantially the same direction" may be defined as being within a predefined range or tolerance of being the same direction.

The controller may be configured to determine when one of the first and second accelerometers may be moving in a vertical and/or longitudinal axis relative to the other of the first and second accelerometers with a substantially different magnitude (outside of a predetermined range or tolerance) of displacement, velocity and/or acceleration. The controller may thus determine that one of the first and second sleeves is being moved independently of the other of the first and second sleeves.

The controller may be configured to determine when one of the first and second accelerometers is moving in a lateral/sideways direction (e.g. perpendicular to a sagittal plane of the garment/wearer) relative to the other of the first and second accelerometers, e.g. with a substantially different magnitude (outside of a predetermined range or tolerance) of displacement, velocity and/or acceleration. The controller may thus determine that one of the first and second sleeves is being moved independently of the other of the first and second sleeves.

When determining relative movements of the first and second accelerometers, the controller may also refer to the absolute movement (e.g. displacement) of the first and second accelerometers to determine which of the sleeves is moving (e.g. rearward and/or laterally outwards) and thus which of the first and second indicator lights to activate.

The controller may be configured to receive data from a third accelerometer. As for the first and second accelerometers, the third accelerometer may be a three-axis accelerometer, e.g. providing acceleration in three orthogonal axes. The third accelerometer may not be provided on either of the first and second sleeves. The controller may compare the data from the third accelerometer against the data from the first and/or second accelerometers to filter out movements common to the first and second accelerometers and determine when one of the first and second sleeves is being moved independently of the other of the first and second sleeves. The third accelerometer may be calibrated in a similar manner to the first and second accelerometers.

The controller may be configured to determine when one of the first and second accelerometers is moving relative to the third accelerometer beyond a threshold amount in a predetermined direction. In particular, the controller may be configured to determine when one of the first and second accelerometers is moving relative to the third accelerometer and the other of the first and second accelerometers beyond a threshold amount in a predetermined direction. The controller may determine that the one of the first and second sleeves is being moved independently of the other of the first and second sleeves. Data from the third accelerometer may assist in providing greater certainty with fewer false positives and may assist in building up an overall picture of the wearer's movement.

The garment may further comprise the third accelerometer. The third accelerometer may be provided in a body portion, e.g. trunk portion, of the garment. Alternatively, the third accelerometer may be provided on a bicycle upon which the wearer rides. In a further alternative, the third accelerometer may be provided by a smartphone, e.g. an accelerometer within the smartphone. The smartphone may be carried by the wearer of the garment, e.g. in a pocket on the body portion of the garment, or mounted on the bicycle.

The garment may comprise a smartphone pocket for stowing a smartphone. The smartphone pocket may comprises a transparent cover. The transparent cover may permit use of a touch sensitive screen of the smartphone through the transparent cover. The smartphone pocket may be provided on the first or second sleeve.

The first and second indicator lights may be provided at a respective shoulder or upper arm region of the garment, e.g. so as to be high up and not to be obscured by a rucksack. Additionally or alternatively, the first and second indicator lights may be provided at or towards a distal end of the respective sleeve, e.g. at a wrist end/bottom of the sleeve. The garment may comprise a plurality of first indicator lights and a plurality of second indicator lights. One or more of the first and second indicator lights may be provided at the shoulder region and one or more of the first and second indicator lights may be provided at or towards the distal end of the sleeve.

The garment may further comprise at least one brake light. The brake light or at least one of the brake lights may be provided on a body/trunk portion of the garment, e.g. at or towards the bottom of the garment so as not to be obscured by a rucksack. The controller may be configured to activate the brake light upon detection of a deceleration by the first and/or second accelerometers. The controller may be configured to activate the brake light upon detection of a deceleration by the third accelerometer. The controller may be configured to compare data from the accelerometers to determine the occurrence of a deceleration event that is common to the accelerometers and is indicative of a braking event.

The controller may be configured to communicate with a smartphone, e.g. wirelessly or via a wire. The smartphone may be connected to the controller via a wireless protocol, such as Bluetooth®, Wi-Fi® or any other wireless protocol. The smartphone may be GPS-enabled and may be capable of determining a route to a particular destination. The smartphone may share route information with the controller. The smartphone may collect motion data from the first, second and/or third accelerometers via the controller. The smartphone may monitor a riding style of the wearer and provide feedback relating to the riding style. The smartphone may have an app installed thereon, which may provide an interface for the wearer of the garment to access data provided by the garment and/or control parameters of the garment.

The controller may be configured to determine from data from the accelerometers that a crash event has occurred. For example, the controller may determine when an acceleration or deceleration has exceeded a threshold value, e.g. to determine that the movement is not in a normal range of bicycle movement, and that a crash has occurred. The controller may be configured to transmit a crash event signal to a third party via the smartphone. For example, the smartphone may transmit the crash event signal to the emergency services, next of kin and/or employer. The crash event signal may be sent to a server together with the location of the crash event. The server may collate accident data from cycling garments and/or other sources to determine accident hotspot zones. The smartphone may receive data from the server about upcoming accident zones for a particular route and may warn the rider accordingly.

The controller may be configured to determine from data from the accelerometers the condition of the surface being ridden over, e.g. whether a pothole or speed bump has been ridden over. Road condition data (e.g. location of potholes, date ridden over, severity of potholes etc.) may be sent to a server. The server may collate road condition data to determine road condition zones. The smartphone may receive data about upcoming poor road condition zones and may warn the rider accordingly.

The garment may comprise multi-colored lights on each of the first and second sleeves. The multi-colored light may be provided by a particular light capable of emitting several different colors of light or a plurality of lights, each with a different color. A first color, e.g. orange or yellow, of the multi-colored light may correspond to the first and second indicator lights. A second color, e.g. red, of the multi-colored light may provide a danger signal to the wearer (e.g. to warn of accident hotspot and/or poor road conditions). The presence of a potential danger may be determined by the connected smartphone. A third color, e.g. white, of the multi-colored light may provide navigation instructions to the wearer. The navigation instructions may be provided by the connected smartphone. A fourth color, e.g. blue, of the multi-colored light may provide information about a route, such as a warning about an upcoming junction so that the wearer may be ready to take an appropriate action. The route information may be provided by the connected smartphone.

The garment may further comprise first and second vibration modules in the first and second sleeves of the garment respectively. The first and second vibration modules may be configured to provide the wearer of the garment with a vibration alert. The first and second vibration modules may be configured to indicate to the wearer of the garment when to turn. By vibrating an appropriate one of the first and second vibrating modules, the controller may indicate to the wearer which direction to turn. The controller may be provided with directional information from a smartphone, which has determined a route. The first and second vibration modules may be provided at the wrist end of the first and second sleeves respectively. Each of the first and second vibration modules may be integral with a respective one of the first and second accelerometers.

The controller may connect to one or more of the first, second and third accelerometers via a wired connection. The wires may extend at least partially through seams of the garment. Alternatively, the controller may be wirelessly connected to one or more of the accelerometers.

The garment may further comprise a power source, e.g. to provide power to the controller and the other electronic components.

The controller may be configured to determine that the wearer has finished the maneuver and switch off the appropriate first or second indicating light. Completion of the maneuver may be determined by tracking the location of the wearer and determining that the wearer has passed the junction, e.g. with reference to a map. Additionally or alternatively, completion of the maneuver may be determined by tracking movement data from the accelerometers and determining that the wearer has completed the maneuver, e.g. a turn.

The controller may be configured to control at least one parameter (e.g. other than the indicating lights) depending on at least one gesture sensed by the first and/or second accelerometers.

The garment may have a cycling mode and a pedestrian mode. The indicating light functionality may be disabled in the pedestrian mode. The garment may toggle between the cycling mode and pedestrian mode upon detection of a gesture by the controller.

According to another aspect of the present disclosure, there is provided an indicating system for cycling, the indicating system comprising:

at least one first indicating light, e.g. providable on a first arm of a cyclist;

at least one second indicating light, e.g. providable on a second arm of the cyclist;

a first accelerometer providable on the first arm of the cyclist;

a second accelerometer providable on the second arm of the cyclist; and a controller configured to:

receive data from the first and second accelerometers;

compare the data from one of the first and second accelerometers with data from the other of the first and second accelerometers to filter out movements common to the accelerometers and determine when one of the first and second arms is being moved independently of the other of the first and second arms;

determine when the first and second accelerometers are moving in opposite vertical and/or longitudinal directions with approximately equal magnitude of displacement, velocity and/or acceleration and thereby determine that one of the first and second arms is not being moved independently of the other of the first and second arms; and illuminate the appropriate first or second indicating light depending on which arm has been moved.

According to another aspect of the present disclosure, there is provided a method for an indicating system, the indicating system comprising:

at least one first indicating light, e.g. providable on a first arm of a cyclist;

at least one second indicating light, e.g. providable on a second arm of the cyclist;

a first accelerometer providable on the first arm of the cyclist;

a second accelerometer providable on the second arm of the cyclist;

wherein the method comprises:

receiving data from the first and second accelerometers;

comparing the data from one of the first and second accelerometers with data from the other of the first and second accelerometers to filter out movements common to the accelerometers and determine when one of the first and second arms is being moved independently of the other of the first and second arms;

determining when the first and second accelerometers are moving in opposite vertical and/or longitudinal directions with substantially the same magnitude of displacement, velocity and/or acceleration and thereby determine that one of the first and second arms is not being moved independently of the other of the first and second arms; and illuminating the appropriate first or second indicating light depending on which arm has been moved.

Features mentioned above in respect of the garment may equally apply to the indicating system or method for the indicating system. For example, the indicating system may comprise the above-mentioned garment.

The present disclosure also provides software, such as a computer program or a computer program product, and a computer readable medium having stored thereon a program. The software, when executed by a computing apparatus, may cause the computing apparatus to perform the above-mentioned method. A computer program embodying the invention may be stored on a computer-readable medium, or it could, for example, be in the form of a signal such as a downloadable data signal provided from the Internet, or it could be in any other form.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in which.

BRIEF DESCRIPTION OF THE DRAWINGS

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
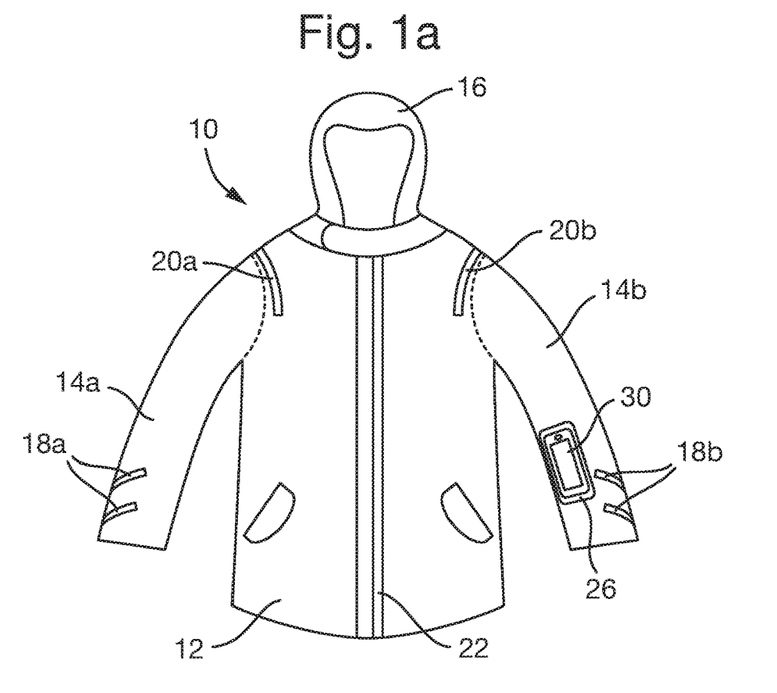
FIGS. 1A and 1B are front and back views respectively of a garment according to an embodiment of the present disclosure.
Figure 1B:
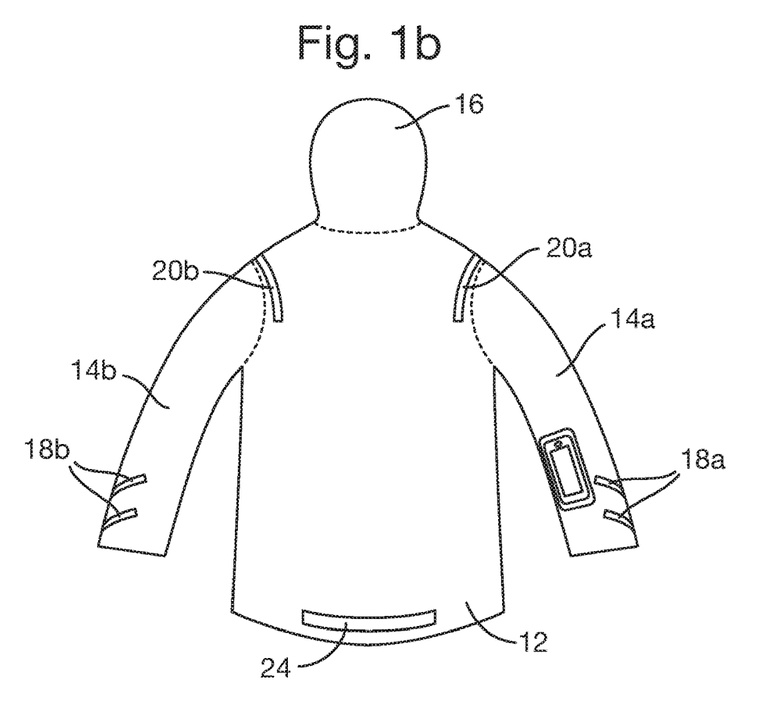
Figure 2:
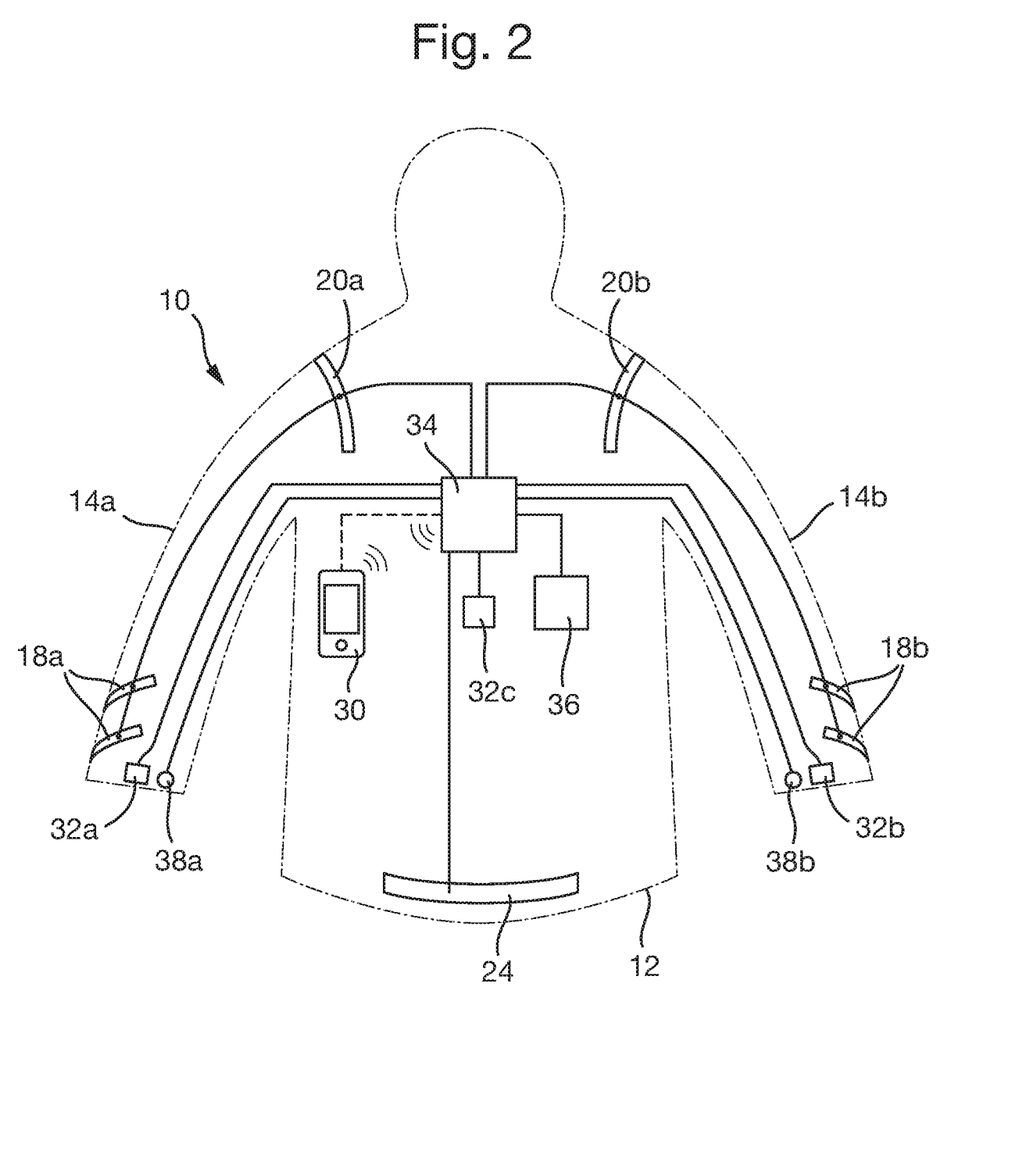
FIG. 2 is a schematic view of a garment according to an embodiment of the present disclosure.

With reference to FIGS. 1A, 1B and 2, a garment 10, such as a jacket, comprises a body portion 12 and first and second sleeves 14a, 14b, which extend from the body portion 12 on opposite sides of the body portion. The body portion 12 may cover the trunk of a wearer, whereas the first and second sleeves 14a, 14b cover respective arms of the wearer. The garment 10 may further comprise an optional hood 16. The garment 10 may be a cycling garment, but it may also be used for other sports, activities or purposes. For example, the garment 10 may be used for cycling, riding a motorbike, riding a scooter (whether seated or standing), horse riding etc. Furthermore, although a jacket is depicted, the garment may be any other type of upper body garment, such as a jumper, sweater, shirt, coat, gilet or any other garment.

The garment 10 further comprises at least one first indicating light associated with the first sleeve 14a of the garment and at least one second indicating light associated with the second sleeve 14b of the garment. As depicted, the garment 10 comprises first indicating lights 18a provided at a distal end of the first sleeve 14a and a first indicating light 20a provided in a shoulder region of the garment 10 associated with the first sleeve 14a. The garment 10 also comprises a second indicating light 18b provided at a distal end of the second sleeve 14b and a second indicating light 20b provided in a shoulder region associated with the second sleeve 14b. In either case, the shoulder region may be on the respective sleeve, body portion or where the two join. In an alternative embodiment, the first and second indicating lights 20a, 20b may be provided in a respective upper arm region of the garment. In any event, the first and second indicating lights 20a, 20b provided in the shoulder region may be positioned such that they are not obscured by a rucksack worn on top of the garment.

As depicted in FIGS. 1A and 1B, the first and second indicating lights 20a, 20b provided in the shoulder (or upper arm) regions may extend over the respective shoulders (or arms) of the garment so as to be present on the front and rear sides of the garment. Likewise, the first and second indicating lights 18a, 18b provided at the ends of the sleeves may also be visible from the front and rear of the garment. For example, the first and second indicating lights 20a, 20b provided at the shoulder region may be elongate strips, although they may equally be formed from one or more discrete lights. The first and second indicating lights 18a, 18b provided at the ends of the sleeves may form one or more chevrons. In an alternative embodiment the first and second indicating lights 18a, 18b at the ends of the sleeves may each comprise a plurality of lights distributed around the circumference of the respective sleeve. In either case, the first and second indicating lights 18a, 18b at the ends of the sleeves may be visible from the front and the rear of the garment.

The first and second indicating lights 18a, 18b, 20a, 20b may, when lit, indicate to others the intended direction of travel for the wearer of the garment. Accordingly, the first and second indicating lights 18a, 18b, 20a, 20b may produce light with an orange or yellow colour.

The garment 10 may further comprise a front light 22 and a rear light 24. The front light 22 may produce light white in colour, whereas the rear light 24 may produce light red in colour. The rear light 24 may be provided towards the bottom end of the garment so that it is not obscured by a rucksack worn over the garment. The front light 22 may extend alongside a front opening of the garment 10.

Each of the above mentioned lights may comprise light emitting diodes (LEDs). Each of the lights may emit light of an appropriate colour or a range of possible colours, e.g. by varying the amount of red, green or blue light emitted. The lights may be provided as strips with a continuous strip light or a plurality of discrete lights provided along the strip. The lights may be provided on an outer surface of the garment 10 and the lights may be bonded and/or stitched onto the garment.

Referring to FIG. 1A, the garment 10 may further comprise a pocket 26 for receiving a smartphone 30. The pocket 26 may be provided with a transparent cover so that the smartphone screen may be visible when the smartphone is in the pocket 26. The transparent cover may be configured so as to permit use of a touch sensitive screen of the smartphone through the transparent cover. As depicted in FIG. 1A, the smartphone pocket 26 may be provided on one of the first and second sleeves 14a, 14b. Providing the smartphone pocket 26 on one of the sleeves 14a, 14b may allow the wearer to read information, such as route directions, displayed on the smartphone. However, it is also envisaged that the smartphone pocket 26 may be provided elsewhere on the garment, e.g. on or in the body portion 12. For example, the smartphone pocket may also be provided inside the garment and the transparent cover may be omitted.

With reference to FIG. 2, the garment 10 further comprises a first accelerometer 32a provided on the first sleeve 14*a* and a second accelerometer 32*b* provided on the second sleeve 14*b*. As depicted, the first and second accelerometers 32*a*, 32*b* may be provided at the distal, e.g. wrist, end of the respective sleeve. However, the first and second accelerometers 32*a*, 32*b* may be provided at other locations on the respective sleeve, e.g. near an elbow region or upper arm region of the sleeve. The garment 10 may further comprise an optional third accelerometer 32*c*, which may be provided in the body portion 12 of the garment.

The first, second and third accelerometers 32*a*, 32*b*, 32*c* are operatively connected to a controller 34, which receives data from the accelerometers. The controller 34 may comprise a processor for processing the data from the accelerometers and determining when to activate the appropriate indicating light. Although FIG. 2 depicts a separate third accelerometer 32*c*, the functionality of the third accelerometer 32*c* may instead be provided by the smartphone 30 in the event that a smartphone is provided. The smartphone 30 may operatively connect to the controller 34 and may be connected by virtue of a wire or wirelessly, e.g. via Wi-Fi, Bluetooth or any other wireless means. The smartphone 30 may otherwise comprise (e.g. perform the functions of) some or all of the controller 34 and the smartphone may connect to the accelerometers and lights by virtue of a wire or wirelessly.

The controller 34 is also operatively connected to the first indicating lights 18*a*, 20*a* and the second indicating lights 18*b*, 20*b*. In addition, the controller 34 may be operatively connected to the front and/or rear lights 22, 24. As depicted, the controller 34 may be connected to the lights by virtue of one or more wires. The wires may be integrated into the garment 10, for example, the wires may be stitched into seams or provided between layers of the garment 10.

The garment 10 further comprises a power source 36, which provides electrical power to the electronic components of the garment 10. The power source 36 may comprise a rechargeable battery. As depicted, the power source 36 may be connected to the controller 34, which may in turn transmit power to the electronic components of the garment. The same wires may be used to transmit power and data between the controller 34 and the other components of the garment. The power source 36 may be removable from the garment so that it can be readily recharged and the power source 36 may be interchangeable with another power source.

The garment 10 may further comprise first and second vibration modules 38*a*, 38*b* provided in the first and second sleeves 14*a*, 14*b* respectively. The vibration modules 38*a*, 38*b* may be provided at the distal, e.g. wrist, end of the respective sleeve. The first vibration module 38*a* and first accelerometer 32*a* may be provided in an integral package or they may be provided as separate components. The same may apply to the second vibration module 38*b* and second accelerometer 32*b*.

The first and second vibration modules 38*a*, 38*b* may provide the wearer of the garment with a vibration alert. The first and second vibration modules 38*a*, 38*b* may be operatively connected to the controller 34, e.g. via wires provided in the garment. Vibration alerts provided by the first and second vibration modules 38*a*, 38*b* may indicate to the wearer of the garment which direction to turn. The controller 34 may be provided with directional information from the smartphone 30, which may have determined an appropriate route. The smartphone 30 may indicate to the controller 34 when the wearer of the garment is approaching a desired maneuver and the smartphone 30 may indicate to the controller 34 the nature of such a maneuver. The controller 34 may then activate one of the vibration modules 38*a*, 38*b* to indicate to the wearer of the garment in which direction to turn.

As depicted in FIG. 2, each of the components may be connected to the controller 34 via a separate wire, with the exception of the first indicating lights 18*a*, 20*a* and the second indicating lights 18*b*, 20*b*. The first indicating lights 18*a*, 20*a* may be connected by a common wire since the controller 34 may not distinguish between separate ones of the first indicating lights. The same applies for the second indicating lights 18*b*, 20*b*, which may also be connected to the controller via another common wire. The other components, such as the accelerometers and other lights, may however be connected to the controller 34 by separate wires.

Figure 3:
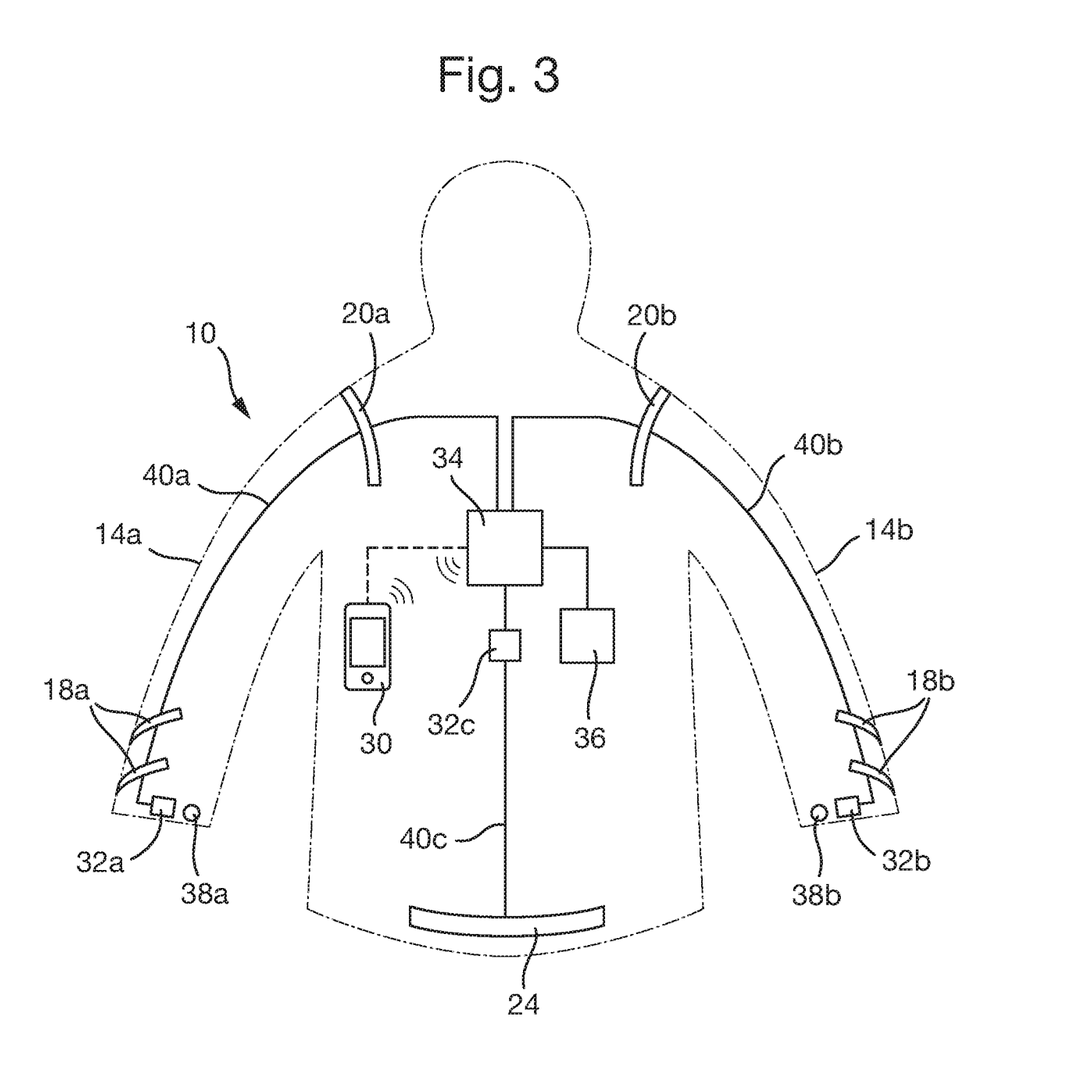
FIG. 3 is a schematic view of a garment according to an embodiment of the present disclosure.

In an alternative embodiment depicted in FIG. 3, the number of wires may be reduced by linking a plurality of different components to the controller 34 via one or more common wires. For example, the first indicator lights 18*a*, 20*a* and the first accelerometer 32*a* may be connected to the controller 34 via a first wire 40*a*, which extends along the first sleeve 14*a*. The first vibration module 38*a* when provided may also connect to the first wire 40*a*. In a similar manner the second indicating lights 18*b*, 20*b*, second accelerometer 32*b* and the second vibration module 38*b* (if provided) may be connected to the controller 34 via a second wire 40*b* extending along the second sleeve 14*b*. A third wire 40*c* may connect the controller 34 to the third accelerometer 32*c* and/or the rear lights 24. However, the third accelerometer 32*c* and the controller 34, although depicted as separate components, may be provided in a unitary package, in which case the third wire 40*c* does not need to connect to the third accelerometer 32*c*.

In the embodiment depicted in FIG. 3, signals to or from the controller 34 may be multiplexed. Each of the components with which the controller 34 communicates, may have a unique address and instructions from the controller 34 may be sent to a particular component at its corresponding address. Likewise, data from the accelerometers may be sent to the controller, which may have its own address. Each of the components may have a processor for extracting the appropriate data from the common wire and/or sending data through the common wire to a particular component. In this way the common wires 40*a*, 40*b*, 40*c* may form data buses. The common wires 40*a*, 40*b*, 40*c* are depicted as being separate, however, it is equally envisaged that they may be joined as a single connection to the controller 34 may be provided. As mentioned above, the wires may provide data and power to the components of the garment.

The accelerometers 32*a*, 32*b*, 32*c* may be 3-dimensional accelerometers, which are capable of measuring acceleration in three orthogonal axes. The acceleration data may be provided to the controller 34. The controller 34 may integrate the acceleration data to obtain velocities and/or displacements. Alternatively, the integration may be carried out by the accelerometers and the velocity and/or displacement data may be sent to the controller.

The controller 34 compares data from the first and second accelerometers 32*a*, 32*b* in order to determine whether a wearer of the garment has raised an arm to indicate a maneuver. If the controller determines that the wearer of the garment has raised an arm, the controller 34 may send a signal to the first or second indicating lights on the appropriate arm to illuminate the indicating lights on the arm that has been raised.

The controller 34 compares the data from the first and second accelerometers 32*a*, 32*b* to filter out movements that may be common to both the first and second accelerometers, e.g. due to the motion of the bicycle. The comparison of the data from the first and second accelerometers may occur prior to any processing of the data from the accelerometers and/or after processing, e.g. integration, of the data from the first and second accelerometers. The comparison of the data may allow the controller to determine when one of the first and second sleeves is being moved independently of the other of the first and second sleeves. The controller may compare acceleration data, velocity data and/or displacement data to determine whether the wearer of the garment has raised a particular arm. It will be appreciated that the acceleration data, velocity data and displacement data may be in vector form such that values are provided for a particular axis or the combined acceleration velocity or displacement is provided along with the direction in which it occurs.

Figure 4:
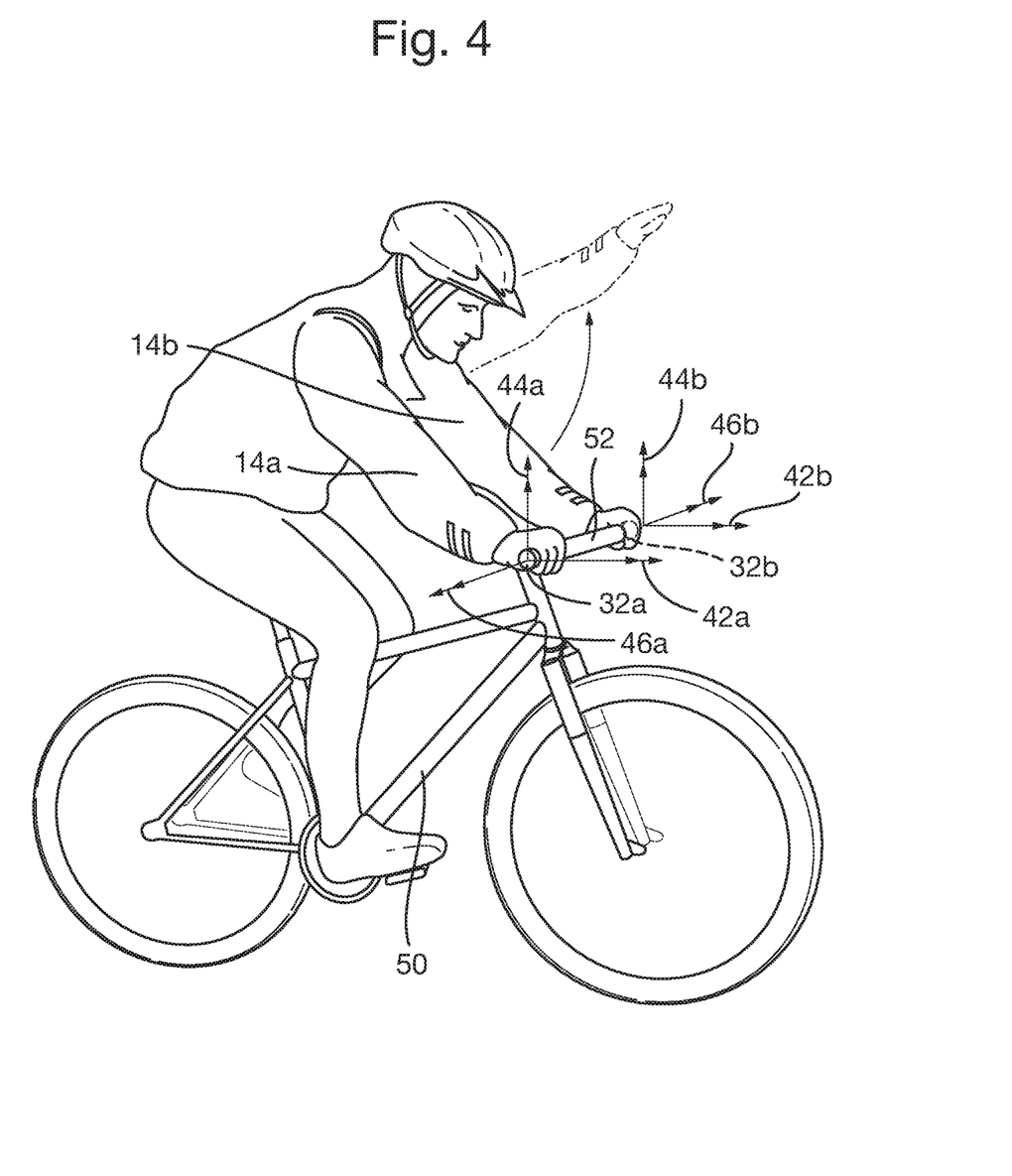
FIG. 4 is a schematic view depicting use of the garment according to embodiments of the present disclosure.

FIG. 4 depicts a frame of reference for each of the first and second accelerometers 32a, 32b. For example, each of the first and second accelerometers 32a, 32b may be subjected to an acceleration (or deceleration) along a longitudinal axis 42a, 42b, and/or along a vertical axis 44a, 44b and/or along a lateral axis 46a, 46b. As depicted in FIG. 4, the longitudinal axis 42a, 42b is aligned in the fore-aft direction of a bicycle 50, and the lateral axis is perpendicular to a sagittal plane of the wearer. The longitudinal, vertical, and lateral axes are mutually orthogonal to one another when the wearer is in a normal, straight-line riding positions (shoulders square to the bicycle handlebars.

The default frame of reference for the first and second accelerometers may however differ from the frame of reference depicted in FIG. 4. The controller 34 may therefore be calibrated to account for the different frame of references such that data from the accelerometers may be transformed into the frame of reference depicted in FIG. 4. For example, the controller may determine in which orientation the first and second accelerometers are relative to a handlebar 52 of the bicycle 50. This relative orientation may depend on the shape of the handlebar and the chosen grip of the rider. The calibration may be achieved in an initial period of cycling where lateral oscillation of the bicycle and a longitudinal acceleration are typically experienced. The controller 34 may determine in which direction the lateral oscillation and/or longitudinal acceleration are occurring and the controller may thus determine how to transform the data coming from the accelerometers so as to be in the frame of reference depicted in FIG. 4. The calibration may also be adjusted during a journey since it is possible that the wearer of the garment may change their default wrist position relative to the handlebar 52. The controller 34 may look for a step change in the data coming from the accelerometers to indicate that the rider's position has changed. The controller 34 may again look for the direction in which lateral oscillations are occurring due to the inherent lateral wobble of a bicycle and thus adjust the calibration so that the data from the accelerometers can be transformed to the frame of reference depicted in FIG. 4.

The calibration of the accelerometers may be avoided (or may be less necessary), if the accelerometers are provided at a location on the sleeves away from the wrists. For example, the first and second accelerometers may be provided closer to the upper end of the sleeves where less variation of the rider's position is likely to occur.

The controller 34 may determine when one of the first and second accelerometers 32a, 32b is moving relative to the other of the first and second accelerometers with a relative displacement, velocity or acceleration that exceeds a threshold amount for a particular direction. If said threshold amount has been exceeded for a particular direction, the controller may determine that one of the first and second sleeves 14a, 14b has been moved independently of the other of the first and second sleeves and that therefore the one of the first and second sleeves has been raised to indicate a maneuver. For example, the controller 34 may monitor the upwards displacement of the first and second accelerometers 32a, 32b and, if the relative displacement between the accelerometers (that is, the displacement of one of the accelerometers relative to the other one) exceeds a predetermined threshold, then the controller 34 may determine that a particular arm has been raised to indicate a maneuver.

Accordingly, it will be appreciated that the controller 34 may determine that the one of the first and second sleeves is not being moved independently of the other of the first and second sleeves when the first and second accelerometers 32a, 32b are moving in substantially the same direction with approximately equal magnitude of displacement, velocity and/or acceleration. In the present context, "approximately equal magnitude" may be defined as being within a pre-defined range or tolerance of being precisely equal in magnitude. For example, when moving forward or going over a bump, both the first and second accelerometers may move in substantially the same direction and with approximately equal magnitude of movement (displacement, velocity and/or acceleration). In such cases the controller may determine that one of the first and second sleeves is not being moved independently of the other of the first and second sleeves.

However, there may be occasions when the first and second accelerometers are moving relative to one another, but it is not intended to raise an arm to indicate a maneuver. For example, when leaning into a corner, one sleeve may move downwards while another moves upwards or when turning a handle bar one sleeve may move forward while another moves rearward. To ensure that such movements do not result in a false-positive determination of an arm being raised, the controller 34 determines when the first and second accelerometers 32a, 32b are moving in opposite directions with approximately equal magnitude of displacement, velocity and/or acceleration. In particular, if the magnitude of displacement, velocity and/or acceleration for one of the first and second accelerometers is within a predetermined threshold of the magnitude of displacement, velocity and/or acceleration to the other of the first and second accelerometers, the controller 34 may determine that a maneuver gesture is not intended and that the relative variation in the movement between the first and second accelerometers is due to the normal variations encountered in riding a bicycle. Such variations are more likely to occur in the vertical and longitudinal axes/directions for the reasons explained above.

On the other hand, the controller 34 may determine when one of the first and second accelerometers 32a, 32b is being moved in a direction (e.g. in the vertical and/or longitudinal axes) relative to the other of the first and second accelerometers with a substantially different magnitude. When the magnitude of movement (displacement, velocity and/or acceleration) is substantially different (e.g. the difference between them falls outside of the predetermined range or tolerance) the controller 34 may thus determine that one of the first and second sleeves 14a, 14b is being moved independently of the other of the first and second sleeves. In other words, the controller 34 may determine that the difference in magnitude of the movements experienced by the first and second accelerometers is outside the normal range of movement of a bicycle and that as a result one of the sleeves is being raised independently of the other.

As mentioned above, variations of movement in the longitudinal and vertical axes may occur during the normal course of riding a bicycle. However, owing to the lateral nature of the handlebar 52, lateral variations in the relative movement between the first and second accelerometers are less likely to occur. Therefore, the controller 34 may monitor the relative lateral movement between the first and second accelerometers 32a, 32b. When one of the first and second accelerometers 32a, 32b is moving in a lateral direction relative to the other of the first and second accelerometers, e.g. with a different (falling outside of a predetermined range or tolerance) magnitude of displacement, velocity and/or acceleration above a threshold value, the controller may determine that one of the first and second sleeves 14a, 14b is being moved independently of the other of the first and second sleeves. The controller 34 may determine which of the accelerometers 32a, 32b is moving outwardly relative to the bicycle 50 to determine which of the sleeves 14a, 14b is moving. The controller 34 may thus determine which of the first and second indicator lights to activate.

As mentioned above, the controller 34 may receive data from the optional third accelerometer 32c, which is provided on garment at a location other than on either of the first and second sleeves 14a, 14b. The controller 34 may compare the data from the third accelerometer 32c against the data from the first and/or second accelerometers 32a, 32b to filter out movements common to the first and second accelerometers and determine when one of the first and second sleeves is being moved independently of the other of the first and second sleeves. The third accelerometer 32c may be calibrated in a similar manner to that described above for the first and second accelerometers 32a, 32b.

The controller 34 may be configured to determine when one of the first and second accelerometers 32a, 32b is moving relative to the third accelerometer 32c beyond a threshold amount in a particular direction. Alternatively, the controller 34 may determine when one of the first and second accelerometers 32a, 32b is moving relative to the third accelerometer 32c and the other of the first and second accelerometers 32a, 32b beyond a threshold amount in a particular direction. In this way, movement of a particular accelerometer is being compared to movement of two other accelerometers. The controller 34 may thus more accurately determine that one of the first and second sleeves 14a, 14b is being moved independently of the other of the first and second sleeves 14a, 14b in a manner indicative of indicating an upcoming maneuver.

The rear light 24 may function as a brake light. The controller 34 may activate the rear light 24 upon detection of a deceleration by the first, second and/or third accelerometers, e.g. in the forward direction. The controller 34 may require that two or more of the accelerometers or at least the third accelerometer are decelerating to activate the rear light 24.

In a similar manner, the controller 34 may determine with data from one or more of the accelerometers 32a, 32b, 32c that a crash event has occurred. For example, the controller may determine when an acceleration (or deceleration) has exceeded a threshold value, which is considered to be outside the normal range of bicycle movement. The controller may also determine if the rider is no longer upright (e.g. by monitoring the lateral and/or downwards movements) and/or if the rider is stationary immediately following the period of excessive acceleration (or deceleration). One or both of these factors may help the controller to verify the occurrence of a crash event. The controller may thus determine that a crash has occurred. As mentioned above, the controller 34 may be operatively connected to a smartphone 30. The controller 34 may send a signal to the smartphone 30 that indicates that a crash event has occurred and the smartphone may send a message to a third party notifying them of the crash event. The smartphone 30 may also indicate the time and location of the crash event. The smartphone 30 may automatically transmit the crash event signal to the emergency services, a designated next of kin and/or employer.

The smartphone 30 may collect motion data from the first, second and/or third accelerometers 32a, 32b, 32c via the controller 34. Such data may allow a user to monitor their riding style and the smartphone may provide useful feedback. The smartphone 30 may have an app installed. The app may provide an interface for a user to access the data from the garment 10. The smartphone 30 may provide audio signals to the wearer, for example route instructions or information. The smartphone 30 may provide such audio signals via a speaker provided on the smartphone or earphones.

The first and second indicating lights 18a, 18b provided at the distal end of the sleeves may be capable of emitting a plurality of different colors. As mentioned above, the first and second indicator lights may emit an orange or yellow color when indicating a maneuver. However, the first and second indicator lights may emit one or more additional colors. The additional colors may be provided by the first and second indicating lights 18a, 18b or they may be provided by separate lights provided on the garment 10.

For example, the first and second indicator lights 18a, 18b may also emit a second color, e.g. red, which may indicate to the wearer of the garment that there is a potential danger ahead. The smartphone 30 may determine if there is the potential for danger based on the current or upcoming location of the wearer of the garment and knowledge of the surroundings. The controller 34 may receive such danger data from the smartphone 30 and may instruct the first and second indicator lights to emit the second color accordingly.

By way of example, the second color may warn the wearer about the condition of the road ahead and/or that there is a bicycle accident hotspot ahead. Data about the road condition (e.g. presence of potholes, speed bumps, poor surface etc.) may be collected by the first, second and/or third accelerometers, e.g. by detecting vertical oscillations, and such data may be sent to a server along with the location at which the vertical oscillations occurred (via the controller 34 and smartphone 30). Likewise, accident data for bicycles may be collated and stored on a server. If the number of bicycle accidents in a particular area exceeds a certain threshold over a certain time period, that particular area may be considered an accident hotspot. The smartphone 30 may receive accident hotspot data and/or road condition data from the server and if the smartphone determines that the wearer of the garment is in or about to enter such a zone, the smartphone may instruct the first and second indicator lights 18a, 18b to illuminate with the second colour. The smartphone may also determine a route that avoids such zones.

The first and second indicator lights 18a, 18b may also emit a third color, e.g. white, which may provide navigation instructions to the wearer. The navigation instructions may be provided by the connected smartphone 30 via the controller 34. For example, the controller may instruct the first indicator light 18a to emit the third color to indicate to the wearer of the garment to turn in the direction of the first sleeve 14*a*. The appropriate vibration module 38*a*, 38*b* may also be actuated at the same time.

The first and second indicator lights 18*a*, 18*b* may also emit a fourth color, e.g. blue, which may provide information about a route, such as a warning about an upcoming junction so that the wearer can take pre-emptive action. Again, the route information may be provided by the connected smartphone 30 via the controller 34.

Data from the first and second accelerometers 32*a*, 32*b* may also be used to control one or more parameters of the controller 34, bicycle 50 and/or smartphone 30. In particular, the controller 34 may be configured such that one or more gestures may control a corresponding parameter of the controller 34, bicycle 50 and/or smartphone 30. For example, twisting a particular wrist; twisting the other wrist; touching particular parts of the rider (e.g. helmet) and/or clapping hands together may perform certain operations. Example operations include navigating a menu system; toggling between a pedestrian mode and a cycling mode; requesting data relating to the journey (e.g. navigational data, route instructions etc.), controlling audio parameters (e.g. volume, track selection etc.), controlling call related functions (e.g. answer incoming call, hang-up etc.), activating lights of the garment (e.g. hazard light mode etc.), turning on or off an electric motor associated with the bicycle 50 or any other operation.

The controller 34 may determine when a particular gesture has been performed. If appropriate the controller may then send a signal to the smartphone 30 indicating to the smartphone that the particular gesture has been performed. The smartphone may then perform the appropriate function. The appropriate function may depend on the particular mode of the smartphone, the current application that is running and/or a user setting.

In a particular example, the garment 10 may have a pedestrian mode and a cycling mode. In the pedestrian mode the above-described indicating light functionality may be disabled. The garment may be toggled between the pedestrian and cycling modes with a particular gesture, for example clapping. The controller 34 may look for acceleration spikes from each of the first and second accelerometers that occur at the same time, with a similar magnitude and/or in the opposite direction. Such accelerations are indicative of a clap event. The controller 34 may toggle between the two modes when the clap event is detected. The controller may communicate to the wearer that the garment is in a particular mode, e.g. by activating one or more of the lights and/or vibrating modules in a particular fashion. Other gestures (e.g. twisting wrists) may control different parameters depending on whether the garment is in the pedestrian mode or cycling mode. For example, twisting a particular wrist when in the pedestrian mode may control the music player, whereas in the cycling mode twisting the same wrist may request route based information.

In an alternative embodiment of the present disclosure, the indicating lights may be omitted from the garment and the above-described gestures sensed by the first and second accelerometers may control parameters of the smartphone, e.g. as described above.

Figure 5:
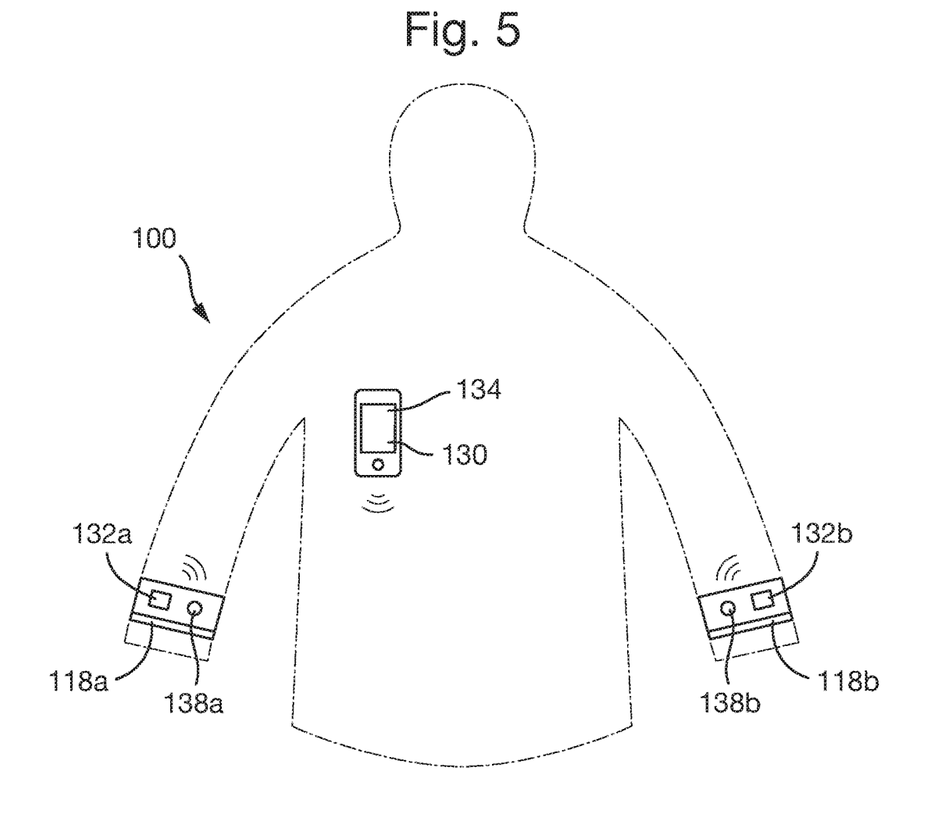
FIG. 5 is a schematic view of an indicating system according to an embodiment of the present disclosure.

Referring now to FIG. 5, in an alternative embodiment the garment may be omitted. Instead, an indicating system 100 comprises a first indicating light 118*a* and a first accelerometer 132*a*, which may be provided on a first arm, and a second indicating light 118*b* and a second accelerometer 132*b*, which may be provided on a second arm. The first indicating light 118*a* and first accelerometer 132*a* may be integrally formed, e.g. on a band which may be provided around a wearer's arm or on a first glove. Likewise, the second indicating light 118*b* and the second accelerometer 132*b* may be integrally formed, e.g. onto a separate band which may be provided around the wearer's second arm or on a second glove. The first and second indicating lights 118*a*, 118*b* may extend around the circumference of the respective band.

The system 100 may further comprise a controller 134, which is operatively connectable to the first and second accelerometers 132*a*, 132*b* and the first and second indicating lights 118*a*, 118*b*. The controller 134 may be provided on the body of the wearer. In the particular embodiment shown, the controller 134 may be provided by a smartphone 130. The controller 134 may wirelessly communicate with the first and second accelerometers 132*a*, 132*b* and the first and second indicating lights 118*a*, 118*b*. Each band may comprise a power source to power the respective indicating light and communication means for communicating with the controller 134. The band power sources may be rechargeable.

The indicating system 100 functions in a similar manner to the garment 10 described above. For example, the controller 134 receives data from the first and second accelerometers 132*a*, 132*b* and compares the data from the accelerometers to filter out movements common to both the first and second accelerometers. The controller 134 may thus determine when one of the first and second arms is being moved independently of the other of the first and second arms and the controller 134 may illuminate the appropriate first or second indicating light 118*a*, 118*b* depending on which arm has been raised.

Other features described in respect of the garment 10 may also apply to the system 100. For example, the bands may optionally comprise first and second vibration modules 138*a*, 138*b*. Also, as mentioned above, the smartphone 130 may provide a third accelerometer which may function in a manner described above. The smartphone 130 may be provided with software, e.g. an app that provides the functionality to communicate with the accelerometers and activate the indicator lights when required.

The system 100 may be conveniently applied when wearing of the garment is not desirable. The system 100 may also be cheaper to implement, as a bespoke garment is not required. For example, the bands may be simply applied over existing garments.

In an alternative embodiment of the system 100, the indicating lights and accelerometers may not be integrally formed and may be separate components. The indicating lights may be provided on a band (or elsewhere as will be described below) and one or more of the accelerometers may be provided on a smartwatch or activity tracker. The smartwatch or activity tracker may be connected to or may comprise the controller. The smartwatch or activity tracker may be worn on one wrist. A band or sleeve with an accelerometer may be worn on the other wrist. The band with the accelerometer may also connect to the controller or the smartwatch. Such an embodiment may otherwise function as described above.

In another alternative embodiment of the system 100, the first and second indicating lights 118*a*, 118*b* may instead or additionally be provided elsewhere, e.g. on a bag, such as a messenger bag or rucksack. The first and second indicating lights may be provided on opposite lateral sides of the bag or the lights may be configured to indicate the intended direction, e.g. with an arrow. The bag may also comprise other lights, such as a brake light like that described above. A power source may be provided in the bag to provide power for the lights. The bag may comprise other elements of the system 100, such as the controller 134 and/or a third accelerometer like those described above. However, one or more of these elements may instead be provided by a smartphone, which may or may not be provided in the bag and which may communicate with the lights provided on the bag. As for the system 100 depicted in FIG. 5, the first and second accelerometers may be provided on corresponding bands, gloves or smartwatch, which may communicate with the controller to illuminate the appropriate indicating light.

In a yet further alternative embodiment of the system 100, the first and second indicating lights 118*a*, 118*b* may be provided on a gilet, e.g. near or around arm holes of the gilet. The gilet may otherwise be similar to the bag described above.

Figure 6:
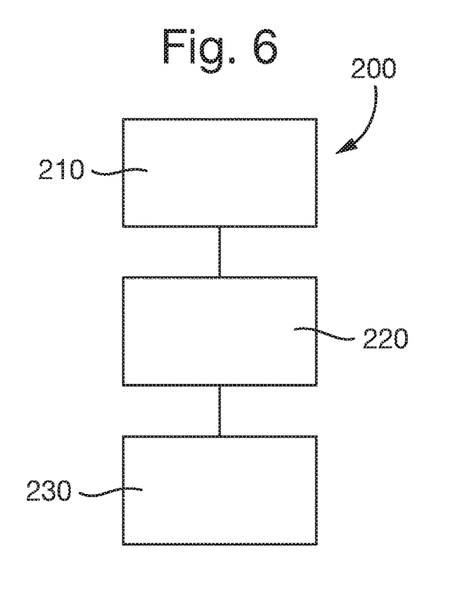
FIG. 6 is a flow chart depicting a method according to an embodiment of the present disclosure.

Referring now to FIG. 6, a method 200 for the indicating system 100 or garment 10 will be described. In a first step 210 the controller receives data from the first and second accelerometers. In a second step 220 the controller compares the data from the first and second accelerometers and filters out movements common to both the first and second accelerometers so as to determine when one of the first and second arms has been moved independently of the other of the first and second arms in a manner indicative of a maneuver gesture. In a third step 230 the controller may illuminate the first or second indicating light if in step 220 it is determined that the first or second arm has been raised to indicate a maneuver. The controller may continue to illuminate the first or second indicating light for a predetermined period of time such that the indicating lights are turned off after a certain time has elapsed. During said time period the controller may continue to track movement of the first and second accelerometers and the controller may switch off the indicating light when it is determined that the respective arm is no longer raised. Alternatively, the controller may switch off the indicating light after a predetermined period of time since the arm has been lowered and/or once it has been determined that the wearer has finished the maneuver, thereby allowing the rider to return their arm to the handlebar to safely perform the maneuver with the appropriate indicating light still on. Completion of the maneuver may be determined by tracking the location of the wearer and, with reference to a map, determining that the wearer has passed the junction. Additionally or alternatively, completion of the maneuver may be determined by tracking movement data from the accelerometers and determining that the wearer has completed a turn, e.g. by determining that the acceleration, velocity and/or displacement in the lateral direction is below a certain threshold.

It will be appreciated by those skilled in the art that although the invention has been described by way of example, with reference to one or more examples, it is not limited to the disclosed examples and alternative examples may be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A garment for cycling comprising:
   first and second accelerometers provided on respective first and second sleeves;
   a signal light provided on the garment; and
   a controller operative to receive from the first and second accelerometers respective movement-indicating signals, and based thereupon to control illumination of the signal light as follows:
   illuminate the signal light if the respective accelerometer signals indicate relative movement between the accelerometers exceeds a threshold; and
   suppress illumination of the signal light if respective movements of the accelerometers are simultaneously in opposite directions along vertical and/or longitudinal axes and approximately equal in magnitude.

2. The garment of claim 1, wherein the controller is further operative to determine when the accelerometers are moving in a common direction with substantially equal magnitude, and thereby determine that the sleeves are not being moved independently of one another.

3. The garment of claim 1, wherein the controller is further operative to determine when the accelerometers are moving relative to one another along vertical and/or longitudinal axes with a substantially different magnitude and thereby determine that the sleeves are being moved independently of one another.

4. The garment of claim 1, wherein the controller is operative to determine when the accelerometers are moving relative to one another along the lateral axis and determine therefrom that the sleeves are being moved independently of one another.

5. The garment of claim 1, wherein the controller is further operative to receive signals from a third accelerometer and compare the signals from the third accelerometer against signals from the first and/or second accelerometers to filter out movements common to the first and second sleeves and determine when the sleeves are being moved independently of one another.

6. The garment of claim 5, wherein the third accelerometer is provided on a body portion of the garment.

7. The garment of claim 6, further comprising a pocket on a body portion of the garment, and wherein the third accelerometer comprises a smartphone carried in the pocket.

8. The garment of claim 5, wherein the controller is further operative to compare data from the accelerometers to determine a deceleration event that is common to the accelerometers and is indicative of a braking event.

9. The garment of claim 1, further comprising first and second vibration modules in the first and second sleeves of the garment respectively, the vibration modules being operative to provide a wearer of the garment with an alert.

10. A garment for cycling comprising:
    first and second accelerometers on respective first and second sleeves; and
    a controller receiving signals from the accelerometers and, if the signals indicate approximately equal movement of the accelerometers in opposite directions in vertical and/or longitudinal axes, determining therefrom that a garment wearer's arms have not moved to indicate a turn, and suppressing illumination of a turn signal light, wherein the controller is further operative to receive signals from a third accelerometer and compare the signals from the third accelerometer against the signals from the first and/or second accelerometers to filter out movements common to the first and second sleeves and determine when the sleeves are being moved independently of one another.

11. The garment of claim 10, wherein the controller is further operative to determine when the first and second accelerometers are moving in a common direction with substantially equal magnitude, and thereby determine that the sleeves are not being moved independently of one another.

12. The garment of claim 10, wherein the controller is further operative to determine when the first and second accelerometers are moving relative to one another in vertical and/or longitudinal axes with a substantially different magnitude and thereby determine that the sleeves are being moved independently of one another.

13. The garment of claim 10, wherein the controller is operative to determine when the first and second accelerometers are moving relative to one another along the lateral axis and determine therefrom that the sleeves are being moved independently of one another.

14. The garment of claim 10, wherein the third accelerometer is provided on a body portion of the garment.

15. The garment of claim 14, further comprising a pocket on a body portion of the garment, and wherein the third accelerometer comprises a smartphone carried in the pocket.

16. The garment of claim 10, wherein the controller is further operative to compare data from the accelerometers to determine a deceleration event that is common to the accelerometers and is indicative of a braking event.

17. The garment of claim 10, further comprising first and second vibration modules in the first and second sleeves of the garment respectively, the vibration modules being operative to provide the garment wearer with an alert.

18. The garment of claim 17, wherein each of the first and second vibration modules is integral with a respective one of the first and second accelerometers.

19. A method comprising:
operating first and second accelerometers on respective first and second sleeves of a cycling garment to detect movement of the sleeves; and
operating a controller to analyze data received from the accelerometers, and a) illuminate a signal light if the respective accelerometer signals indicate relative movement between the accelerometers exceeding a threshold, and b) suppress illumination of the signal light if the data indicate approximately equal movement of the accelerometers simultaneously in opposite directions in vertical and/or longitudinal axes.

* * * * *